April 30, 1963 — O. W. SEPP, JR — 3,087,694
PERSONNEL PARACHUTE PACK
Filed Aug. 21, 1961 — 10 Sheets-Sheet 1

INVENTOR.
OSCAR W. SEPP, JR.
BY
Burgess, Ryan & Hicks
ATTORNEYS

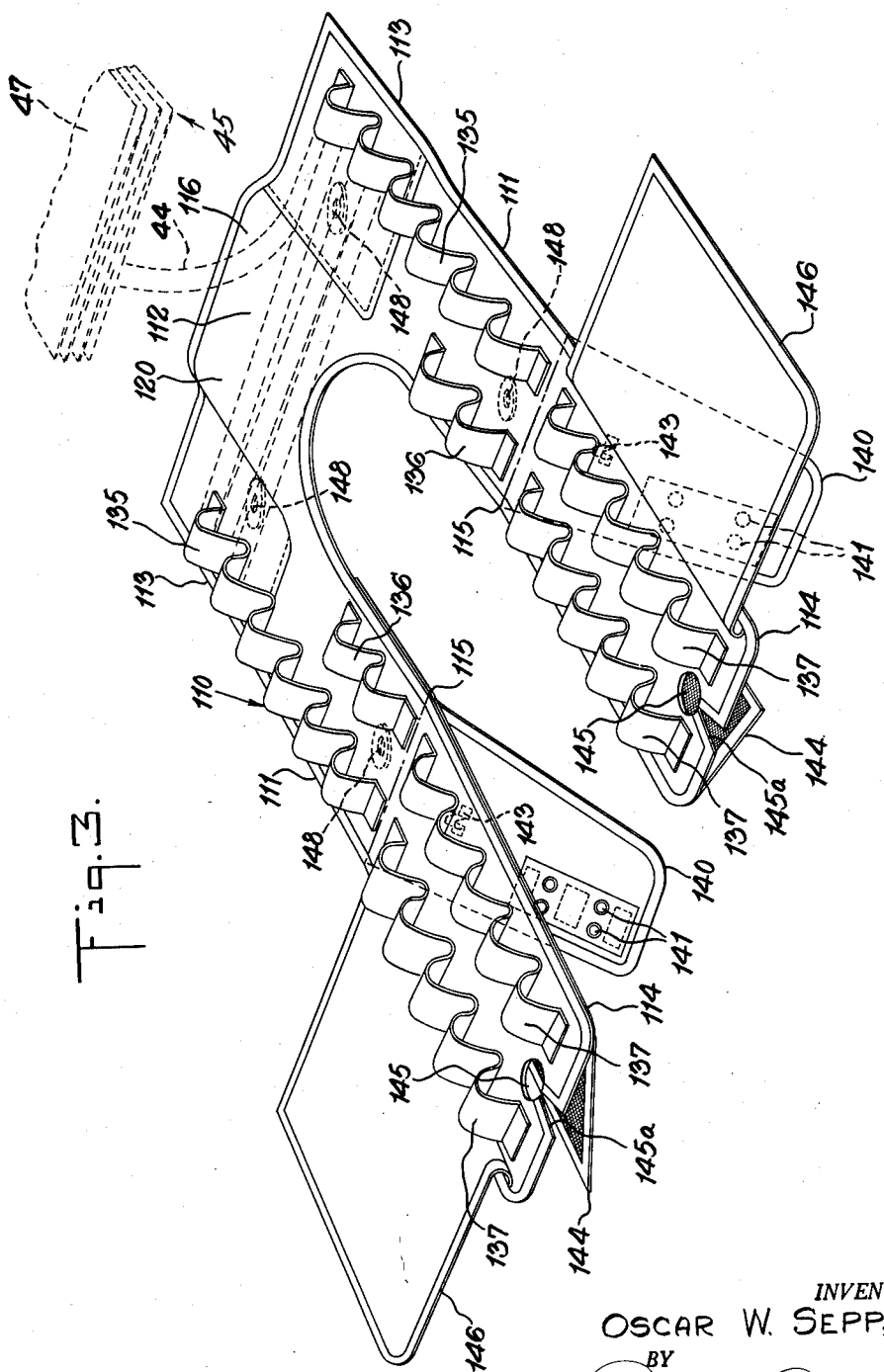

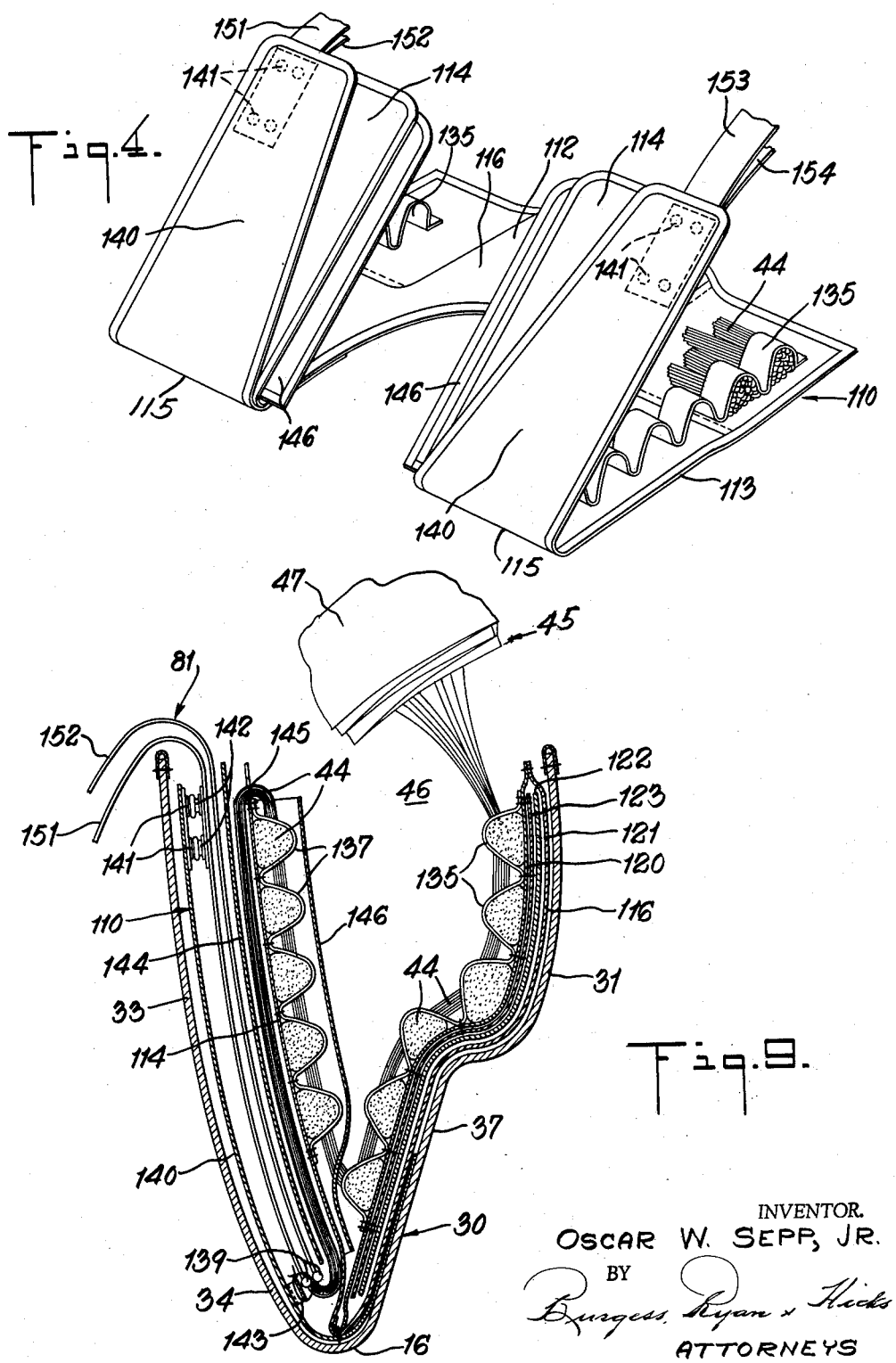

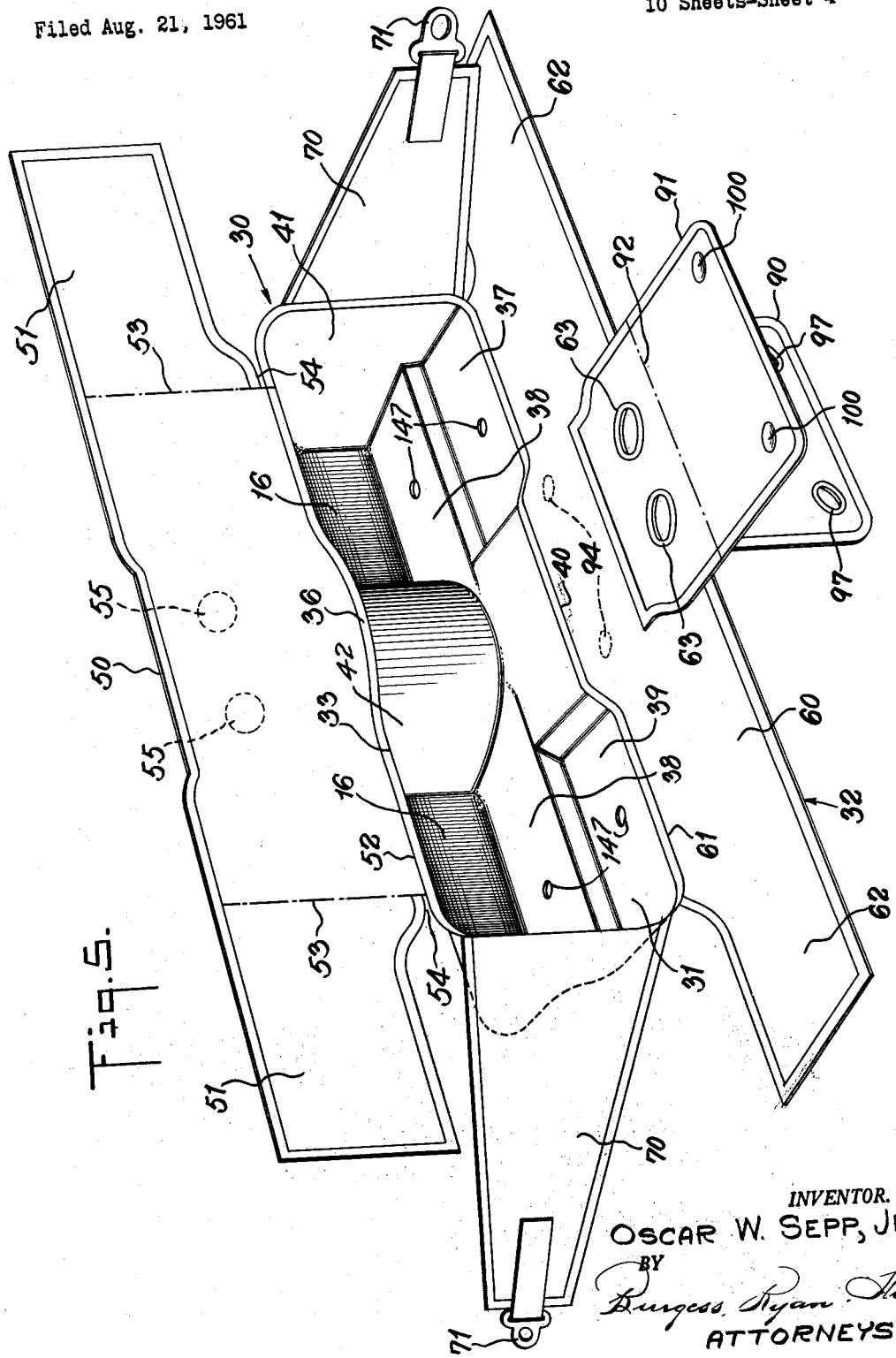

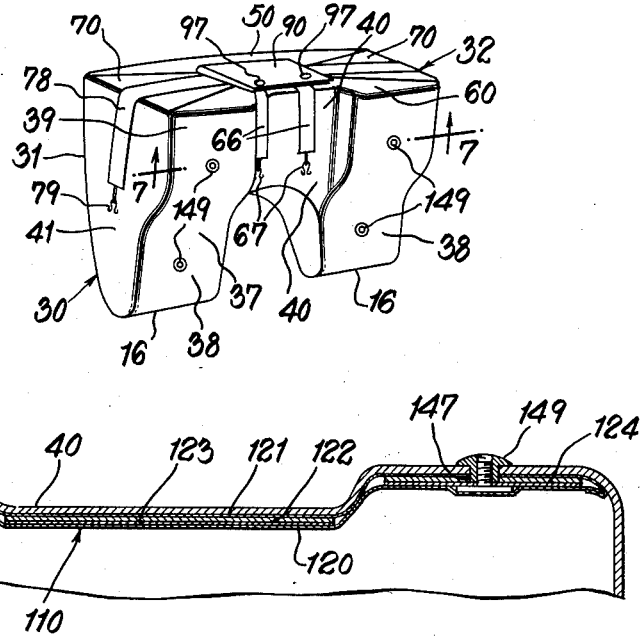
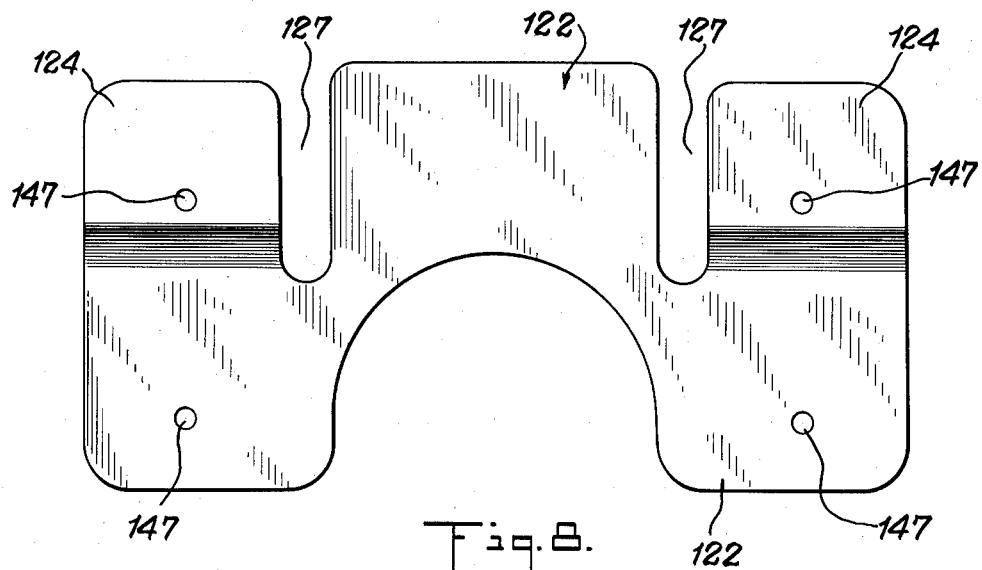

April 30, 1963

O. W. SEPP, JR 3,087,694

PERSONNEL PARACHUTE PACK

Filed Aug. 21, 1961

INVENTOR.
OSCAR W. SEPP, JR.
BY
ATTORNEYS

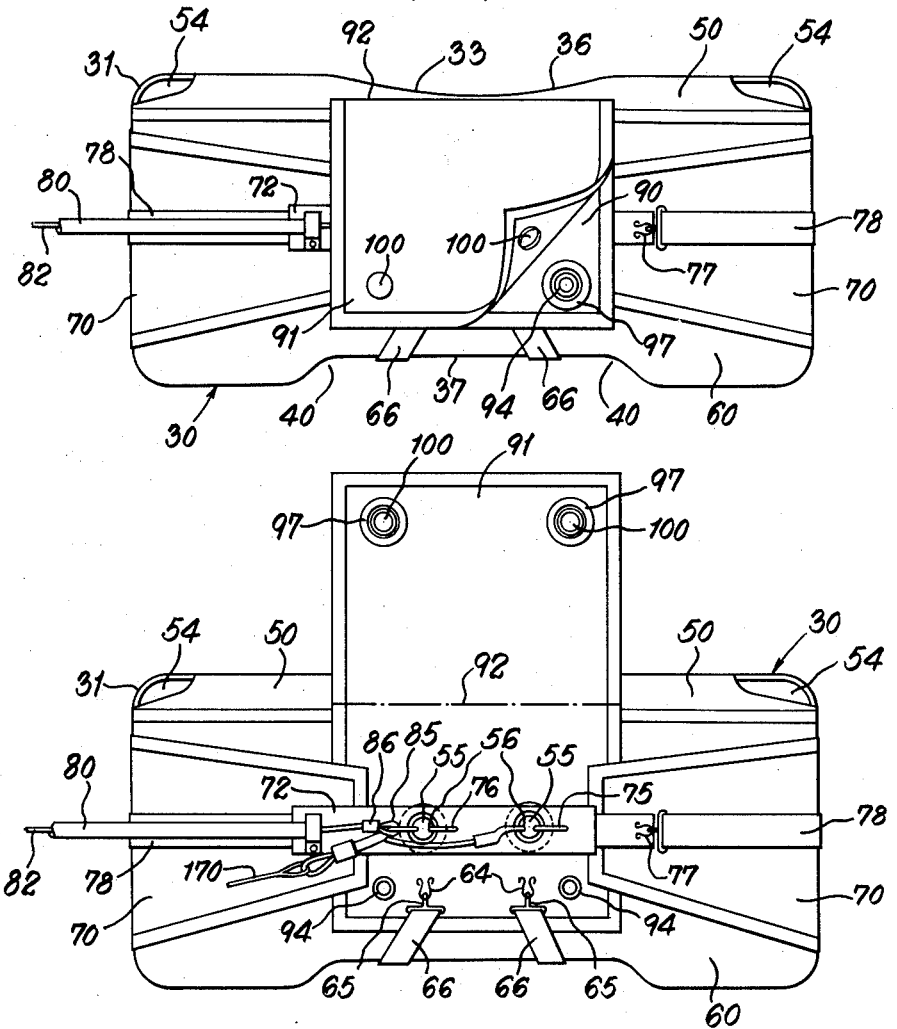

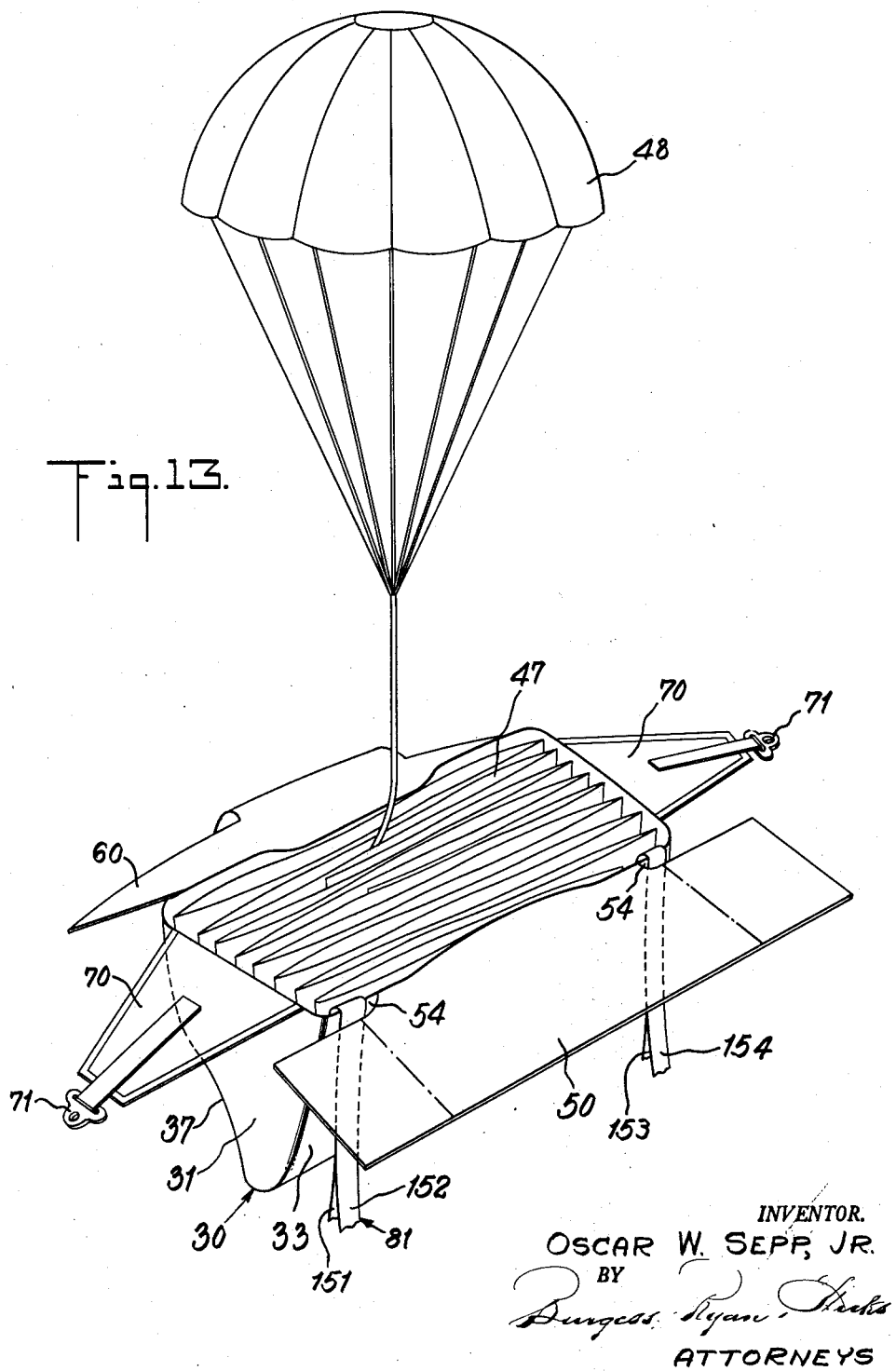

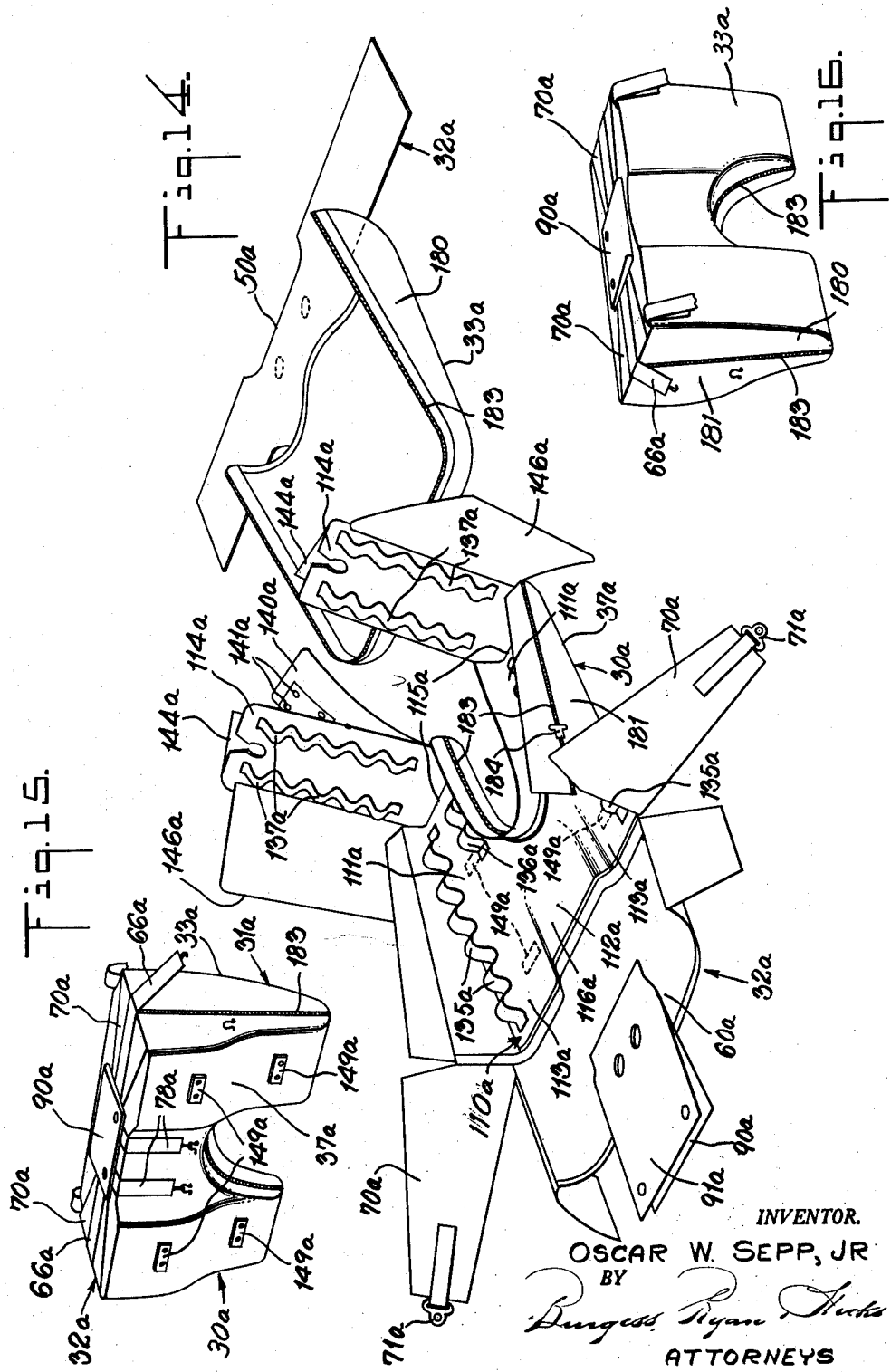

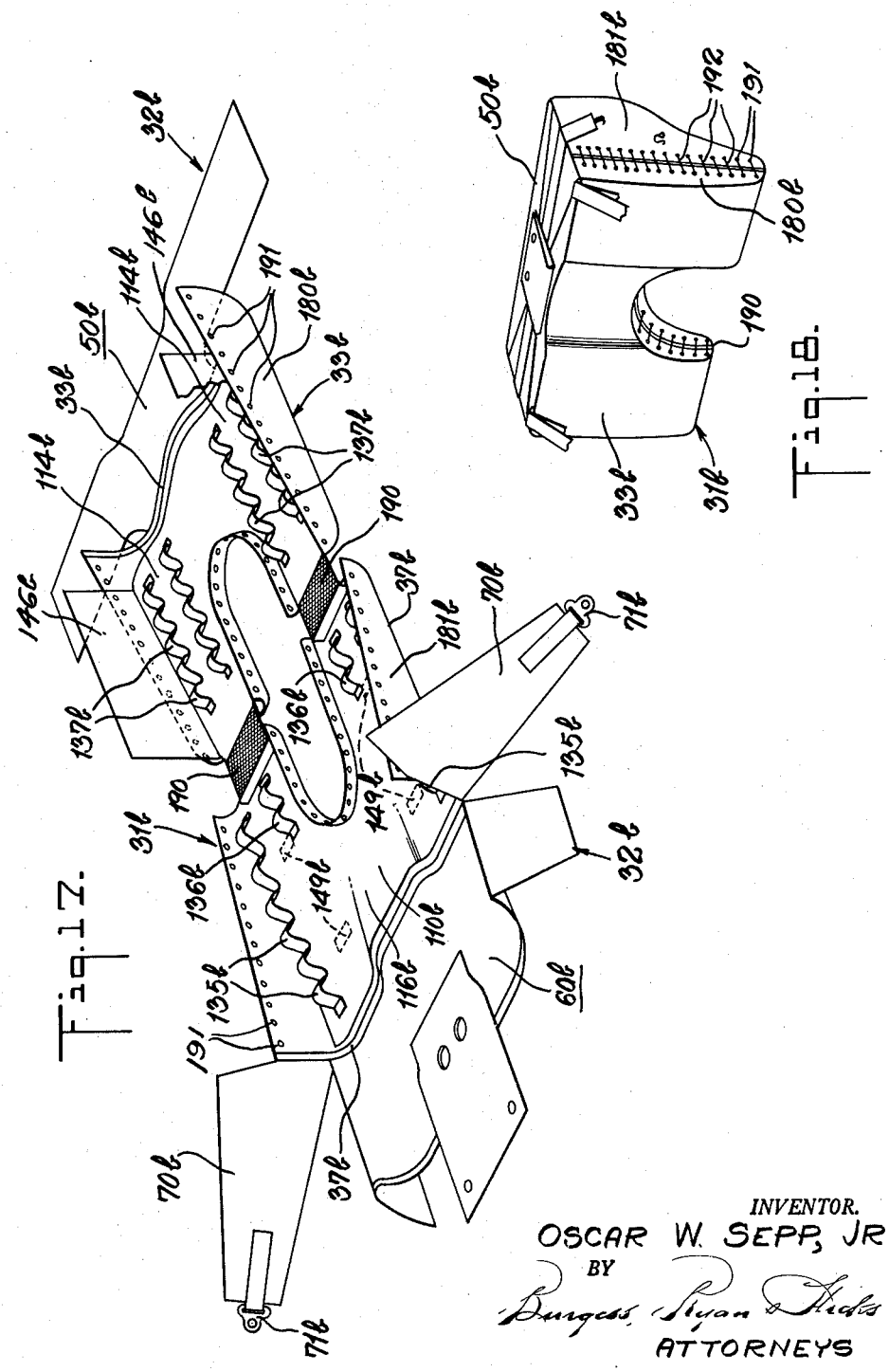

3,087,694
PERSONNEL PARACHUTE PACK
Oscar W. Sepp, Jr., Merrick, N.Y., assignor to M. Steinthal & Co., Inc., New York, N.Y., a corporation of New York
Filed Aug. 21, 1961, Ser. No. 132,730
24 Claims. (Cl. 244—141)

The present invention relates to an aircraft parachute pack and to the components of such a pack.

In certain types of personnel pack assembly, the pack includes not only a main parachute but also a pilot chute in the container of a case. The shroud lines of the main parachute are stowed in the container by serpentizing the bundles of shroud lines therein so that upon release of the parachute, the shroud lines will be unwound and set free from the container in an orderly manner. It is seen, therefore, how important it is to lay the shroud lines in the container in established order and to maintain that order until the parachute is released.

In certain types of seat ejection systems, as for example in the Martin-Baker ejection system, the pack is supported on the ejection seat and the pilot rests his shoulders and/or head thereon, so that the pack is subjected to pressures tending to deform the container. If the walls of the parachute container are flexible, the orderly stowing of the shroud lines and parachute inside the container might be disturbed by deformation of the walls under the conditions described. Moreover, these containers are so designed, that the insides thereof are not so easily accessible, so that it is difficult to arrange, stow and lay away the shroud lines inside the container in orderly predetermined manner for efficient deployment.

One object of the present invention is to provide a new and improved aircraft parachute pack and components thereof, which are designed to permit convenient orderly stowing of the main parachute and its shroud lines therein, and which will retain the parachute and its lines so stowed against disturbance or disruption, even when the pack is subjected to the roughest kind of treatment.

In accordance with one feature of the present invention, there is provided a tray on which the shroud lines of the main parachute can be set or stowed orderly and in a manner to permit deployment of the shroud lines therefrom in predetermined established order. This tray is adapted to be enclosed in a container forming part of the case of the parachute pack and is severable from at least a part of said container to permit said tray to be made easily accessible for packing or loading.

As another feature of the present invention, the pack container is rigid so that the orderly arrangement of the parachute or parachutes and the shroud lines is not disturbed by external pressures on said container.

In accordance with one embodiment of the present invention, the pack container is of unitary construction and desirably in one piece, and the tray can be removed therefrom for loading or packing and returned therein when loaded.

As another feature of the present invention, the container is made of two separable parts and the tray is attached to one of said parts, so that the container can be opened up to render the tray easily accessible for loading. In one specific form, the separable container parts consist of the front and rear walls respectively of the container and are entirely disconnectable and easily connectable, as for example, by a slide fastener or lacing.

In another specific form, the separable container parts consisting of the front and rear walls respectively of the container are hinged together to permit them to be opened and to make the tray connected to one of said walls easily accessible for packing or stowing. These hinged walls can be connected together by means of lacings or other separable fastening means.

Various other objects, features and advantages of the present invention are apparent from the following description and from the accompanying drawings, in which FIG. 1 is a diagrammatic side view showing an assembled personnel parachute pack constituting one embodiment of the present invention, said pack being shown in connection with an aircraft ejection seat, as for example, of the Martin-Baker type;

FIG. 3 is a perspective of a tray on which the shroud lines of the main parachute may be arranged in predetermined order and to which the risers of the pilot's riser-shoulder harness-assembly may be attached in accordance with the embodiment of the present invention shown in FIGS. 1 and 2;

FIG. 4 is a perspective showing the tray of FIG. 3 after the shroud lines of the main parachute have been stowed therein and the risers of the riser-harness assembly have been attached thereto and after said tray has been folded for insertion into the container;

FIG. 5 is a perspective of a one-piece rigid case in accordance with one embodiment of the present invention, shown opened and ready to receive the folded loaded tray of FIG. 4 with the stowed shroud lines thereon;

FIG. 6 is a perspective of the closed assembled pack with the one-piece case of FIG. 5 and showing particularly the rear side of said pack;

FIG. 7 is a section of the rear side of the assembled pack taken on lines 7—7 of FIG. 6 and showing the attachment of the loaded tray onto the rear wall of the case;

FIG. 8 is a plan view of the stiffener employed for the tray of FIG. 3;

FIG. 9 is a section of the assembled pack taken on lines 9—9 of FIG. 2;

FIG. 11 is a top plan view of the personnel parachute pack shown in the embodiment of FIGS. 1–10 but shown after the locking device for releasably holding the closure flaps and the side flaps of the case closure in closed position has been pinned into locking position in the assembling of the pack;

FIG. 12 is a top plan view of the personnel parachute pack of FIG. 11 shown almost completely closed and assembled;

FIG. 13 is a perspective of the personnel parachute pack shown in the embodiment of FIGS. 1–12 and illustrating the pack after the pilot chute has been deployed therefrom and just as the main parachute is being drawn by said pilot chute from the pack;

FIG. 14 is a perspective showing a case constituting another embodiment of the present invention, the case comprising a container having two separate rigid parts forming opposite front and rear walls of the container and adapted to be fastened together by a slide fastener, the tray for stowing the shroud lines being secured to the inside of one of the rigid container parts, said container parts being shown separated for rendering the tray easily accessible for the stowing of the shroud lines thereon;

FIG. 15 is a perspective of the pack including the case of FIG. 14 fully assembled and closed and showing particularly the top and rear sides;

FIG. 16 is a perspective of the pack of FIG. 15 but showing particularly the top and front sides;

FIG. 17 is a perspective showing a case constituting still another embodiment of the present invention, the case comprising a container consisting of two rigid parts forming opposite front and rear walls of the container and hinged together to permit these walls to be opened up, one of said walls having secured thereto the tray for stowing the shroud lines thereon, said case being shown open to render the tray easily accessible for the stowing of the shroud lines thereon; and FIG. 18 is a perspective showing the pack including the case of FIG. 17 fully assembled and closed.

Figure 1:
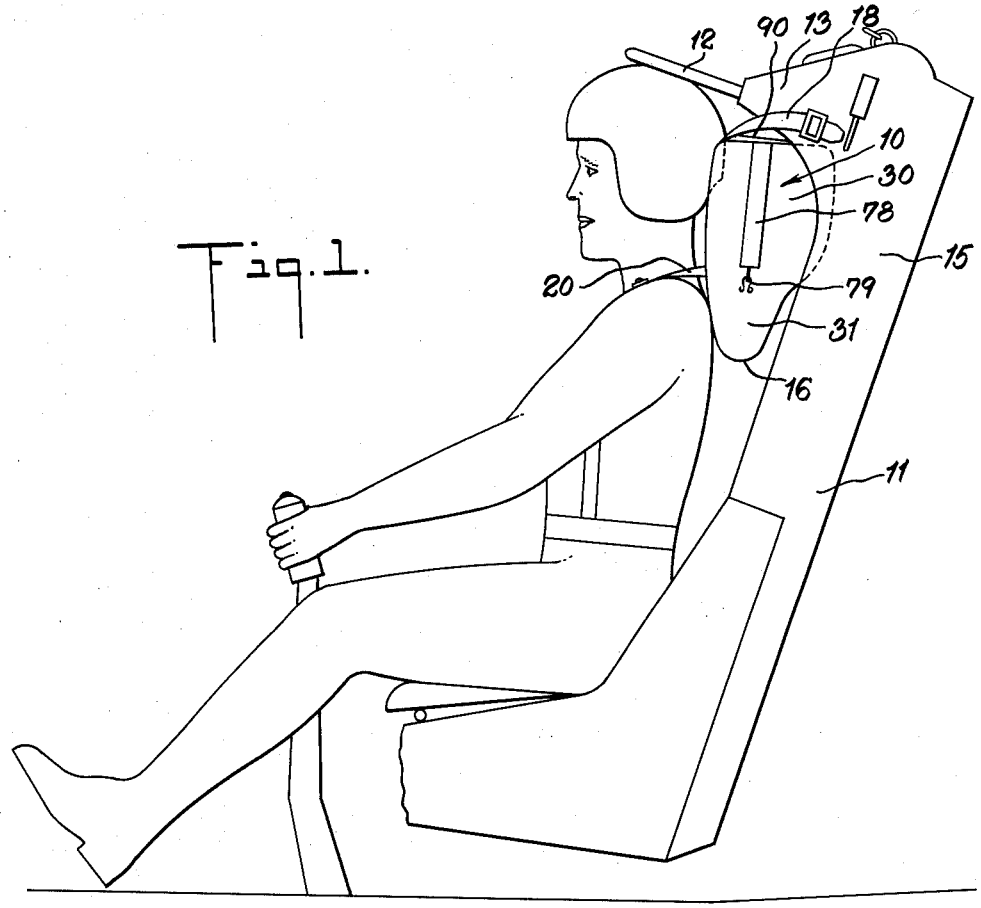

Referring to FIG. 1 of the drawings, the personnel pack assembly 10 of the present invention is shown in connection with an aircraft seat ejection system, but as will be made apparent hereinafter, the pack assembly has features adaptable for use aside from any such system. The parachute pack assembly of the present invention could, for example, be employed in connection with a Martin-Baker seat ejection system. In such a system, upon emergency the seat with the airman thereon is ejected from the aircraft by an ejection gun operating between the seat frame and a fixed part of the aircraft. When the seat is ejected from the aircraft, a drogue parachute is deployed automatically by a drogue gun fired either by tension on a cable or static line connecting the ejected seat to the aircraft, or by a time delay mechanism which is set in motion as the seat leaves the cockpit of the aircraft. This drogue parachute steadies and retards the ejected seat. Upon operation of a manual or automatic release, the airman is separated from the ejected seat and at about the same time a personnel parachute is withdrawn by the drogue parachute from the pack causing the airman, free of the seat, to descend in a normal way under the retarding influence of the personnel parachute.

Copending application, Serial Number 66,616 filed November 1, 1960, discloses a personnel parachute pack assembly which can be operated selectively either in conjunction with an ejection seat system, such as that described above, or independently thereof. The parachute pack assembly of the present invention is also such that it could be operated selectively either in conjunction with an ejection seat system or independently thereof.

The seat ejection system illustrated in FIGURE 1 is shown, as an example, of the Martin-Baker type and since this type of system is well known in the art, it is illustrated only diagrammatically. This system comprises a seat 11 in a cockpit of the aircraft, and a face blind handle 12 located so that it extends directly over the head of the airman and connected to a face screen (not shown). This face screen has two functions, namely (a) to protect the airman's face against damage by the force of the slip stream and to avoid the risk of his lungs being inflated by the air pressure as the seat is ejected from the aircraft, (b) to actuate or release the firing mechanism of the main ejection gun to launch the seat 11 automatically as the screen is drawn upon the airman's face.

The seat 11 is ejected from the aircraft by an ejection gun (not shown) operated between the seat frame and a fixed part of the aircraft. When the seat is ejected from the aircraft, the drogue parachute (not shown) in a drogue parachute container 13 is deployed automatically by the drogue gun (not shown).

The main personnel parachute is stowed in the pack 10 which is different from the drogue parachute pack 13 and which is secured to the seat back 15.

After the sequence of events described, the ejected seat 11 is partially released from the airman and the main pack 10 is separated from the seat back 15 leaving the airman under the control of the open drogue parachute and with the main pack on his back.

Under the influence of the open drogue parachute, pack release pins to be described in the pack 10 are pulled by a rip cord device, causing the pack to be opened and the main parachute to be extracted from the pack by the drogue parachute. The seat 11 at this time is still partly attached to the airman by means of straps (not shown) connected to the airman's parachute harness. As the main parachute canopy develops, the inertia of the seat disengages spring clips (not shown) attaching these straps to the seat and permits thereby the seat to fall away from the airman. The airman then makes a normal descent under the retarding influence of the open main parachute.

The functions described are those of a well known type of seat ejection system. The present invention is concerned with the construction of the personnel pack assembly 10 per se, and to its component parts. The specific means by which the personnel pack assembly may be operated selectively, either in conjunction with the seat ejection system, in which this pack assembly comes into play only after the seat is ejected from the cockpit or independently thereof, are not per se part of the present invention. For the latter operation, the airman could sever the connection between the pack release pins to be described and the drogue gun while the airman is in the aircraft and can leave the seat and the aircraft taking the pack 10 with him. The pack 10 so separated from the seat ejection system, can be controlled by the airman independently of this seat ejection system to deploy the main parachute for normal descent.

Although the invention is shown in connection with a seat ejection system, and with a system in which the personnel parachute pack assembly can be operated selectively, either in conjunction with an ejection seat system or independently thereof, the present invention can be employed in connection solely with a system in which the pilot with an attached parachute pack can detach himself from the seat for parachute descent solely under his control.

Figure 2:
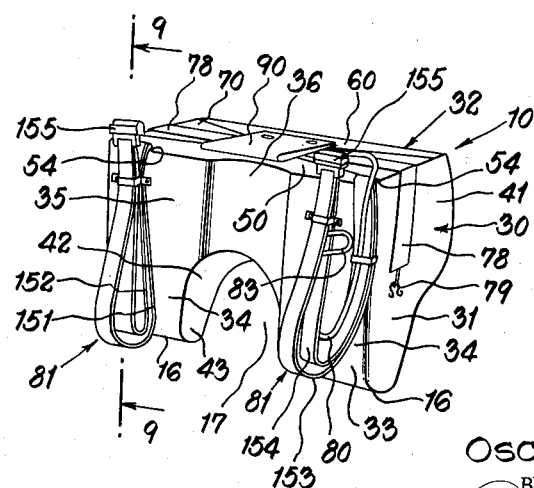
FIG. 2 is a perspective of the fully assembled personnel parachute pack of FIG. 1, and showing particularly the front side of said pack.
Figure 10:
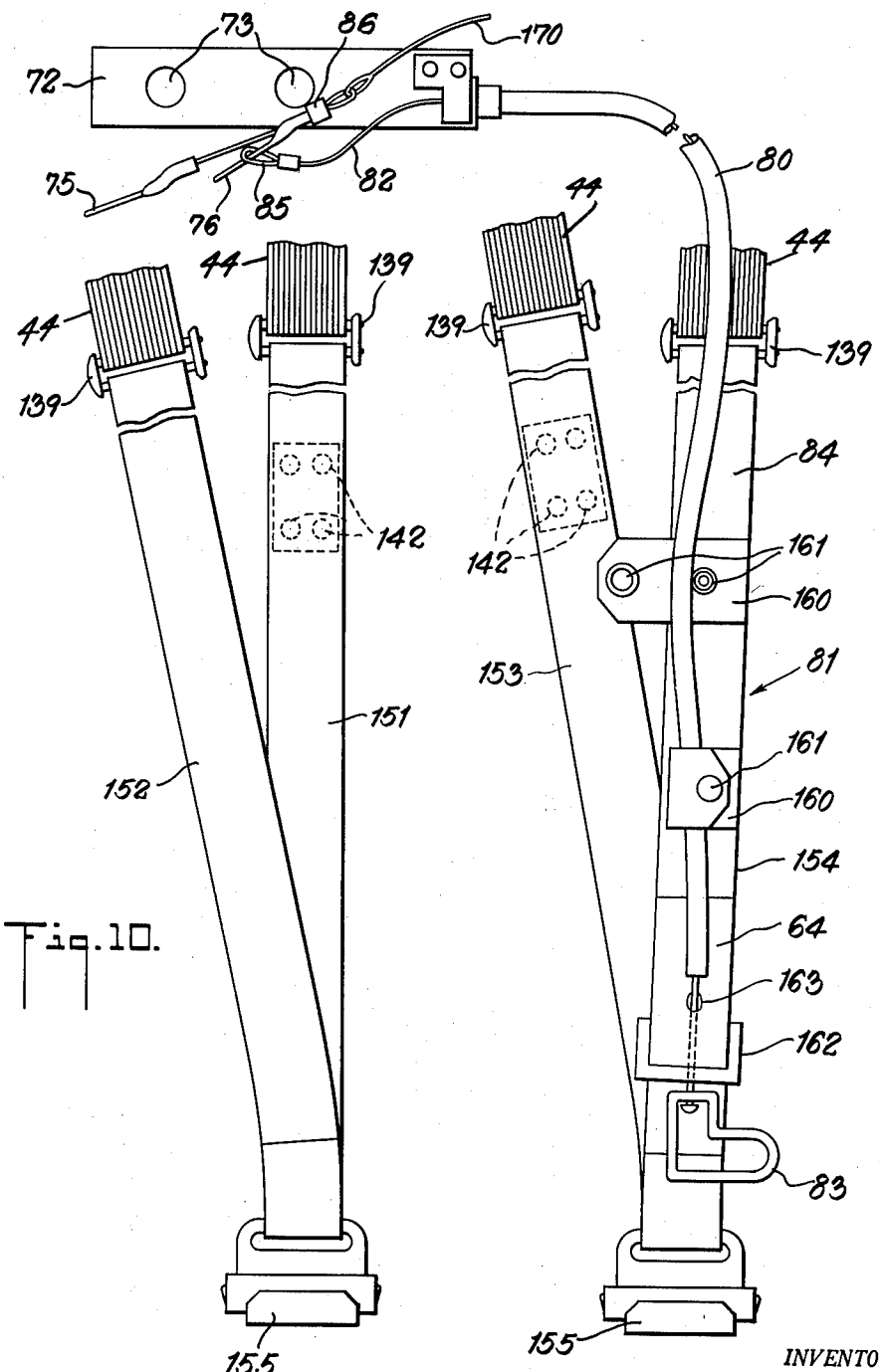
FIG. 10 is a front view of the riser-shoulder harness assembly in connection with the rip cord assembly.

Referring to FIGS. 1 and 2 of the drawings, the pack 10 is of inverted U-shaped form and has two limbs 16 providing a space 17 therebetween through which the lower ends of pack restraint straps 18 and a lug (not shown) of shoulder straps 20 may be attached to the seat back, the point of attachment being at the upper end of the inverted U-shaped space 17, so that the pack is securely held in position. The upper extremity of each pack restraint strap 18 is releasably attached to the seat structure 15 and the lower ends of these straps are releasably attached to the seat structure in the manner well known in the art. The pack 10 can be separated from the seat 11 under the control of the airman by releasing the shoulder straps 20 and the lower extremities of the pack restraint straps 18, in the manner well-known in the art.

The manner in which the main pack 10 of the present invention is attached to the seat 11 and the manner in which it can be separated from the seat under the control of the airman, forms no part of the present invention. Also, the manner in which the drogue line connected to the pack release pins to be described is severed to permit the airman to leave the aircraft and the seat, while carrying the personnel parachute pack, forms no part of the present invention, and may be in the form of a knife (not shown) operated under the control of the airman while in the aircraft.

As a feature of the present invention, the personnel parachute pack 10 of FIGS. 1–13 comprises a case 30 having a main rigid one-piece body portion 31 serving as a container for the main and pilot parachutes, and a series of flexible flaps at the open end of the container forming a cover 32 for the case. The container 31 may be of plastic, fiber glass, metal or combination of these and is U-shaped to define the hollow limbs 16. When the case 30 is packed and operative on the aircraft ejection seat 11, the case is in inverted position with the limbs 16 depending, as described.

The container 31 has a front wall 33 comprising a pair of depending limb sections 34 and a bridging panel 35 across its upper end with a slight inward curvature to present on its outer side a concavity 36 to receive comfortably the head of the pilot. The container 31 has also a rear wall 37 comprising a pair of depending limb sections 38 and a bridging panel 39 across its upper end with an intermediate offset to present on its outer side a recess 40 to receive some cover operating elastic straps to be described.

The two container walls 33 and 37 are integrally and rigidly interconnected by outer side walls 41, tapering towards their lower ends and by an inverted U-shaped crotch panel wall 42 having limb sections 43 tapering towards their lower ends, these side walls and limb sections in conjunction with the limb sections 34 and 38 of the container walls 34 and 37 defining thereby the hollow limbs 16 of the case, with the opposite limb sections 34 and 38 converging towards their lower ends. The hollow limbs 16 serve as compartments for the stowing of parts of the shroud lines 44 (FIGS. 3, 4 and 9) of the main parachute 45 as will be described, and the upper part 46 of the container 31 above these limbs serves as a compartment for the other parts of the shroud lines of the main parachute, for the canopy 47 (FIGS. 3 and 9) of the main parachute and for the pilot chute 48 (FIG. 13).

The flexible cover 32 (FIG. 5) for the rigid container 31 includes a flexible top inner closure flap 50 desirably of suitable fabric stitched or otherwise firmly secured to the upper edge of the front container wall 33 and having two side extensions 51. The flap 50 is adapted to be folded approximately along the fold line 52 over the pilot chute 48 stowed in the top of the container 31 and the side extensions 51 are adapted to be folded downwardly approximately along fold lines 53 into the sides of the container to hold the closure flap 50 down neatly over the parachutes 45 and 48 stowed in the container. The base of the closure flap 50 forms with the upper end of the front container wall 33 slits 54 defining narrow openings at the upper end of the case 30 for the passage of risers into the interior of the container 31, as will be described more fully.

The inner closure flap 50 has a pair of conical locking posts or lugs 55 (FIGS. 5 and 11) secured thereto, as for example, by stitching and having respective locking pin retaining apertures 56 therein.

Also forming part of the flexible cover 32 is an outer closure flap 60 (FIGS. 5, 11 and 12) of flexible material, such as fabric, firmly secured to the upper edge of the rear container wall 37, as for example, by stitching, and adapted to be folded over the fold line 61 from the rear side of the case 30 over the folded inner closure flap 50.

The outer closure flap 60 is of substantially rectangular shape and is at least large enough to extend substantially along the full top of the case 30, when said flap is in closed position folded down along the fold line 61. Two side extensions 62 on the outer closure flap 60 are adapted to be tucked into the sides of the container 31 in folded condition of said outer closure flap. Two spaced grommets 63 on the outer closure flap 60 are located to receive the conical locking posts 55 therethrough when the pack is assembled.

Secured also to the outer closure flap 60, as for example, by stitching, are two eyelets 64 to which may be removably attached hooks 65 to one end of elastic straps 66, the other ends being hooked to eyelets 67 (FIG. 6) secured, as for example, by stitching or tying to the rear container wall 37. These elastic straps extend along the recess 40 of the rear container wall 37, so that they suffer no interference from the ejection seat when the pack is set on the seat and function to pull back the outer closure flap 60 quickly into open position when said inner flap is released in a manner to be described.

The cover 32 also includes side flaps 70 (FIGS. 5, 11 and 12) of flexible material such as fabric, secured to the upper edges of the side container walls 41, as for example, by stitching, and adapted to be folded over the outer closure flap 60 which has been impaled upon the conical locking posts 55.

Clip rings 71 secured to the ends of the side flaps 70 are adapted to be slipped over the locking post 55 and over the outer closure flap 60 in assembled condition of the pack to hold said side flaps down in case closing position. The locking posts 55 are of highly polished metal, and their conical configuration permits the clip rings 71, a rigid lock plate 72 of the releasable closure locking means to be described impaled on said locking posts, and the outer closure flap 60 also impaled on said locking posts to slide off said posts quickly when said members 71, 72 and 60 are released through the release of the lock plate. The lock plate 72 (FIGS. 10 and 11) has a pair of holes 73 spaced and dimensioned to permit the locking posts 55 to pass freely therethrough in assembled condition of the pack. The lock plate 72 is retained on the locking posts 55 through pack release locking pins 75 and 76 passing through the apertures 56 in said posts and releasable through the rip cord device, as will be described.

Eyelets 77 (FIG. 11) on the side flaps 70 are adapted to receive hooks at one end of elastic straps 78, the other ends having hooks for engagement with eyelets 79 (FIGS. 2 and 6) on the side container walls 41. Immediately upon the depinning of the lock plate 72, the tensioned elastic strap 78 will pull back the side flaps 70 into open position.

During assembly, after the outer closure flap 60 has been folded over the inner closure flap 50 with the grommets 63 on said outer closure flap slipped over the locking posts 55 and after the clip rings 71 on the side flaps 70 have been impaled on the locking posts 55 and over the outer closure flap, the lock plate 72 is then impaled on the locking posts 55 directly over the impaled clip rings 71, with these posts extending through said lock plate and the apertures 56 on said posts projecting above said lock plate. The pack release pins 75 and 76 are then slipped through apertures 56 respectively in the locking posts 55 to releasably retain the lock plate 72 in locking position and to hold thereby the overlapping closure flaps 50 and 60 down over the parachute contents of the container 31 and the side flaps 70 down over said closure flaps and the elastic straps 66 and 79 are hooked on to the eyelets 64, 67, 77 and 79, as shown in FIG. 11. This lock plate 72 is connected to the rip cord device in a manner to be described.

The rip cord device comprises a flexible conduit 80 (FIGS. 10 and 11) attached to the riser-shoulder harness assembly 81 in a manner to be described and rigidly secured to one end of the lock plate 72. A flexible cable 82 slidably extending through the conduit 80 is secured at one end to a handle 83 supported on one of the risers 154 through the conduit 80 and has a loop 85 at the other end slipped over the pin 76 to secure said other end to a bridle 86 carrying the two pack release pins 75 and 76. These pack release pins 75 and 76 are adapted to be passed through the apertures 56 respectively in the locking posts 55 while the lock plate 72 is in assembled position impaled on said locking posts and lying over the impaled clip rings 71 as shown in FIG. 11. In this assembled position of the pack, the two overlapping closure flaps 50 and 60 and the side flaps 70 are held down in closed position by the lock plate 72. When the cable 82 is pulled through manipulation of the handle 83, the pins 75 and 76 are pulled out of the locking posts 55 thereby releasing the lock plate 72 so that the clip rings 71 will be free to slip off the locking posts 55 thereby causing the side flaps 70 to be snapped back sideways on the case 30 by the action of the elastic straps 78 and causing the outer closure flap 60 to be snapped back into open position by the action of elastic straps 66. With all these cover flaps and locks released, the pilot chute in the container 31 will be impelled forceably therefrom through the expansion of a spring in the pilot chute or through other well known pilot chute ejection systems.

To protect the lock plate 72 and the bridle 86 with its pack release pins 75 and 76 against accidental release, there is provided a pair of substantial rectangular protective flaps 90 and 91 (FIGS. 2, 5, 6, 11 and 12)

substantially coextensive in size and shape and arranged face to face. These flaps 90 and 91 which are of flexible material, such as fabric or duck, are secured together and to the outer edge of the intermediate section of the outer closure flap 60 and are adapted to be folded along a fold line 92 and over the pinned lock plate 72 and the outer closure flap 50 in the process of assembling the pack. The intermediate section of the outer closure flap 60 has secured thereto, as for example, by stitching, a pair of snap fastener buttons 94 and the flap 90 has a pair of grommets 97 near its free end adapted to be slipped over the snap fastener buttons 94 respectively on the outer closure flap 60 when said flap 90 is folded down along the line 92 and over the pinned lock plate 72.

The second flap 91 also foldable along the fold line 92 with the flap 90, has a pair of snap fastening sockets 100 secured thereto, as for example, by sewing and located in registry with the grommets 97 respectively. These snap fastener sockets 100 passing through the grommets 97 are adapted to be snapped into engagement with the snap fastener buttons 94 on the outer closure flap 60. The flap 91 thereby covers a portion of the flap 90 and through its snap attachment to the outer flap cover 60 holds the flap 90 in closure protective position in relation to the pinned lock plate 72.

Summarizing the sequence of assembling steps so far described, the loaded case 30 from the fully opened position shown in FIG. 5, has its inner closure flap 50 folded along the fold line 52 and over the pilot chute stowed in the container 31. The outer closure flap 60 is then folded along the fold line 61 over the inner closure flap 50 with the grommets 63 on said outer flap impaled on the locking posts 55. The side flaps 70 are then folded over the outer closure flap 60 and the clip rings 71 are slipped over the locking posts 55. The lock plate 72 is then impaled on the locking posts 55 directly over the impaled clip rings 71 and the pack release pins 75 and 76 are slipped through the apertures 56 respectively in the locking posts 55 projecting above the lock plate, as shown in FIG. 11. The protective flaps 90 and 91 are then folded along the fold line 92 over the pinned lock plate 72 and the outer or second protective flap 91 snapped into engagement with snap fastener buttons 94 on the outer closure flap 60 exposed through the grommets 97 on the inner protective flap 90, as shown in FIG. 12.

As important features of the present invention, the case 30 comprises not only the rigid container 31 which retains its predetermined form and retains the packed parachutes therein against disturbance from the orderly manner in which they have been stowed, but also a packing tray 110 (FIGS. 3, 4, 7 and 9) separable at least from a part of the container into readily accessible position to permit easy and convenient packing of the shroud lines 44 of the main parachute 45 thereon. In the embodiment of the invention shown in FIGS. 1–13, the rigid container 31 constitutes a unitary structure which cannot be disassembled and more specifically a one piece structure, and the packing tray 110 is separable from the container. This tray 110 is designed to permit the shroud lines 44 of the main parachute 45 to be packed thereon in neat compact manner for easy safe deployment and the risers of the riser-harness assembly to be detachably anchored thereto. For that purpose, the tray 110 is generally U-shaped and has two legs 111 and a connecting arched cross-piece 112. The crotch panel wall 42 of the container 31 is correspondingly arched to permit said cross-piece to straddle said panel wall and seat thereon conformably when the packed tray is inserted into the container 31.

Each leg 111 of the tray 110 is made of two parts, one upper part 113 serving as the pier legs for the arched cross-piece 112 and the other outer or lower part 114 forming a foldable flap extension of the pier legs 113. Each of these lower flap leg parts 114 is adapted to be folded about a fold line 115 over the upper leg part 113 as shown in FIG. 4, to permit insertion of the folded tray 110 into the container 31 when packed and is adapted to be folded extensibly with respect to said upper leg part for convenience in stowing the shroud lines 44 of the main parachute 45 thereon as shown in FIG. 3. The upper main section 116 of the tray 110 which includes the arched cross-piece 112 and the leg parts 113 and over which the lower leg parts 114 are adapted to overlie in folded position of said lower leg parts is made rigid by means to be described, while the lower leg parts 114 are flexible.

To rigidize the tray section 116 and to facilitate attachment of the tray 110 to the rear container wall 37 after the tray has been packed, said tray section includes two panels 120 (FIGS. 3, 4, 6, 8 and 9) and 121 of flexible material, such as fabric, sewed together around their edges to form a pocket for a stiffener 122 (FIGS. 6 and 7). A reinforcing fabric layer 123 may be interposed between the stiffener 122 and the inner panel 120.

The stiffener 122 is shaped and dimensioned to extend coextensively over the area of the tray section 116, and is desirably made of rigid material, such as aluminum or other metal. Also, the stiffener 122 is shaped to conform with the rear recessed container wall 37 against which said tray section is adapted to be placed when the packed tray 110 is set in the container 31. For that purpose, the stiffener 122 is in the form of an inverted U-shaped plate having upper side sections 124 offset outwardly from the plane of the main body of the plate to define a recess between said side sections. The stiffener 122 so recessed conforms with the recessed rear container wall 37 and thereby permits the recessed section of said rear container wall to nest conformably in the recess in the tray section 116. Since the stiffener 122 is made from a flat metal plate, to facilitate the shaping of this plate in the recessed form described, the plate has a pair of side slits 127 permitting the side sections 124 to be bent out of the plane of the rest of the plate.

Extending along each side of the tray 110 are a series of fabric strips serpentined and stitched to the fabric of the tray to form two rows of loops 135 (FIGS. 3, 4 and 9) in the upper section 116 of the tray 110, two shorter rows of loops 136 in said upper tray section, parallel to said rows of loops 135, and two parallel rows of loops 137 in each foldable lower leg part 114 of the tray. These loops 135, 136 and 137 serve to retain the bundles of the shroud lines 44 in serpentined order on the tray 110 in the manner to be described for successive release as the main parachute is pulled out of the container 31.

The tray 110 has secured to the lower end of each pier part 113 of said tray a foldable flap 140 of flexible material such as fabric, adapted to be folded with the corresponding leg extension 114 about the fold line 115 against the upper leg part 113 of said tray and carrying in its inner face snap fastener sockets 141 for releasable snap attachment to snap fastener buttons 142 (FIG. 10) on the riser webbings of the riser-harness assembly 81 to be described. Near the inner end of the flap 140 close to the fold line 115 and on the inner face of said flap, there is sewed or otherwise secured a loop 143 (FIG. 9) to permit corded attachment thereto of a connector link 139 forming part of the riser-harness assembly for securing the shroud lines 44 to said assembly.

Parts of the shroud lines 44 on their way to the loops 135, 136 and 137 extend in the pocket between each flap 140 and the corresponding leg extension 114. To separate these parts of the shrould lines 44 from parts of the risers extending between each flap 140 and the corresponding leg extension 114, there is hinged to the inner edge of each leg extension 114 a flap 144 made of flexible material such as fabric.

To facilitate extension of the shroud lines from the loops 137 on each leg extension 114 to the pocket between said leg extension and the corresponding flap 140, the outer end of this leg extension is provided with a hole 145 communicating with a tapering entry notch 145a in said leg extension.

To separate the coils of shroud lines 44 in the loops 135 and 136 from the coils of shroud lines in the loops 136 when the packed tray 110 is folded and in the container 31 and to prevent thereby disarrangement or entanglement of these coils, there is provided a flap 146 on the outer side of each leg part 114 of the tray adapted to be folded about said outer side over the corresponding loops 145 and over said leg part.

To firmly secure the packed folded tray 110 inside the container 31, the rear container wall 37 has four spaced holes 147 (FIG. 5) and the upper rigid tray section 116 has four holes 148 (FIG. 3) correspondingly spaced and passing through the fabric layers of said tray section and the stiffener to receive screw fasteners 149 (FIG. 7) each consisting of a screw and a nut. The upper tray section 116 is thereby firmly but removably secured to the rear container wall 37.

The riser-shoulder harness assembly 81 (FIG. 10) which may be employed in connection with the pack of the present invention comprises superposed risers 151 and 152 for the right side of the assembly and the superposed risers 153 and 154 for the left side of the assembly. At one end, each of the pair of superposed risers 151, 152 and the pair of superposed risers 153, 154 carries a release 155 of any well-known type, for example, that known as rocket jet release, for quickly connecting the risers to shoulder straps on the airman or for quickly disconnecting the risers from said straps. At the other end, each of the risers 151, 152, 153 and 154 carries a respective connector link 139 for a set of shroud lines 44 connected to the canopy of the main parachute 45 in the well known manner.

The rip cord assembly is partially connected to the riser-shoulder harness assembly 81. For that purpose, one of the leg sections of the riser-shoulder harness assembly, desirably the one which would extend over the airman's left shoulder, and specifically the riser 154, has secured thereto a pair of straps 160 having snap fastener closing means 161 and serving to hold the flexible conduit 80 of the rip cord assembly along the riser 154. The flexible cable 82 in the conduit 80 for pulling the pins 75 and 76 for pack release, passes at one end through a fabric loop 162 secured to the riser 154, and through a hole 163 in a webbing 164 secured to said riser and to said loop and is connected to the handle 83. A friction clamp (not shown) in the loop 162 releasably holds the handle 83 against accidental displacement.

For packing the tray 110, the shroud lines 44 near the canopy 47 of the main parachute 45 in the form of a single bundle are zig-zagged through some of the loops 135 of the tray in the cross-piece 112 of the tray from one row of loops to the other back and forth, while the tray is in open extended condition outside the container 31, as shown in FIG. 3, and are then divided into two equal branch bundles, each bundle being zig-zagged through the other loops 136 and those loops 135 opposite said other loops 136 in the corresponding pier leg 113 of the tray and then through the two rows of loops 137 on the corresponding leg extension 114 of the tray until the bundle reaches the outer end of said leg extension. The branch bundle of shroud lines 44 is then passed through the corresponding hole 145 and along the outer face of said leg extension, until the corresponding connector link 139 of the riser-harness assembly 81 reaches the vicinity of the corresponding loop 143 on the flap 140 to which it is tied by an easily breakable string or cord. The corresponding riser beyond this connector link 139 is made to extend along the inner face of the corrsponding flap 140 until the snap fastener buttons 142 on the corresponding riser reaches the snap fastener sockets 141 on said inner flap face, whereupon the riser is fastened to said flap through the fastener elements 141 and 142.

After the parachute shroud lines have been packed as described on the open tray 110 and the ends of the risers have been snapped onto the flaps 140 through the connections 141 and 142, the flap 144 is folded over these riser ends, the flaps 146 are folded over the leg extensions 114 of the tray, and the flaps 140 in conjunction with the leg extensions 114 of the tray are folded along the fold lines 115 against the upper section 116 of the tray, with the canopy of the main parachute extending outside of the tray as shown in FIG. 4. The folded tray 110 packed as described, is inserted inside the container 31 with the rigid upper tray section 116 straddling the crouch panel wall 42 of said container and extending conformably against the rear container wall 37 substantially coextensive therewith, while the flexible leg extensions 114 and the flaps 140 extend along the front container wall 33. With the folded packed tray 110 in this position, the upper tray section 116 is firmly secured to the rear container wall 37 by means of the screw fasteners 149.

With the packed tray 110 firmly set in position inside the container 31, the canopy 47 of the main parachute 45 is still outside of the container. The pair of superposed risers 151 and 152 and the pair of superposed risers 153 and 154 attached to the tray through the snap fasteners 141, 142 are then passed from inside the container 31 through respective slits 54 (FIG. 5) in the base of the inner closure flap 50, the canopy 47 of the main parachute 45 is stowed inside the container over the crouch panel wall 42 and the pilot chute 48 which is of the well-known umbrella type or of the type with a built-in ejection coil spring as in the aforesaid copending application Serial No. 66,616, is also stowed in the container over the canopy of the main parachute. With the container 31 fully packed, the flaps 50 and 60 are folded over in overlapping relationship with the conical posts 55 on the inner flap 50 passing through the grommets 63 on the outer flap 60, and with their side extensions 51 and 62 folded down and tucked into the sides of the container 31. The side flaps 70 are then folded down with their clip rings 71 impaled on the projecting locking posts 55, the lock plate 72 is impaled on the locking posts 55 directly over the impaled clip rings and the pack release rings 75 and 76 are slipped through the apertures 56 in said locking posts to releasably retain the lock plate 72 in locking position.

With the pack release rings 75 and 76 pinning the lock plate 72 in position, the elastic straps 66 and 78 are set up by hooking them onto their corresponding eyelets and the protective flaps 90 and 91 are fastened down over the pinned lock plate, as described and as shown in FIG. 12.

As was previously indicated in connection with the operation of the seat ejection system, after seat ejection and the opening of the drogue parachute, the pack release pins 75 and 76 are pulled out to release the pack 10 for the release of the pilot chute 48 and the main parachute 45. For that purpose, a line 170 (FIG. 10) in the release mechanism of the seat ejection system, tensioned by the full development of the drogue parachute and connected to the bridle 86, pulls this bridle and thereby pulls the release pins 75 and 76 from the locking posts 55. This operation releases the pack in the manner described, causing spring ejection of the pilot chute 48 and then of the main parachute 45, as described and as shown in FIG. 13. When the airman desires to leave the aircraft with the pack 10 without going out through the seat ejection system, he severs the line 170 by a suitable cutting device, permitting him to control the release pins 75 and 76 through the rip cord device, as described.

In the operation of opening the pack 10, the pull on the pins 75 and 76, either through the operation of the rip cord unit or through the operation of the drogue parachute releases the lock plate 72. The cover 32 will fly open in the manner described and the pilot chute 48 will be spring ejected from the container 31, as shown in FIG. 13. The development of the pilot chute 48 will extract the main parachute 45 and in the manner which is apparent.

FIGS. 14, 15 and 16 show another embodiment of the invention in which the pack container is made of separable parts permitting said container to be opened up, and the tray is attached to one of said parts. In the drawings of FIGS. 14, 15 and 16, except as otherwise noted, parts similar to parts shown in FIG. 1–13, bear the same number but with the subscript letter a.

In the specific form shown in FIGS. 14, 15 and 16, the case 30a comprises a rigid container 31a and a flexible cover 32a. The container 31a is similar in shape and design to the container 31 in the construction of FIGS. 1–13, except that the container 31a is made of two rigid parts comprising a front wall 33a with a peripheral flange 180 and a rear wall 37a with a peripheral flange 181. These flanges 180 and 181 have similar shapes and dimensions to permit their edges to come together in registering abutment when the container walls 33a and 37a are brought together. When these container walls 33a and 37a are secured together, the flanges 180 and 181 conjointly define the side walls and the bottom walls of the container 31a. The two wall flanges 180 and 181 have slide fastener elements 183 along their edges cooperating with a slide 184 by which the flanges may be fastened together to from the inverted U-shaped container 31a or may be unfastened to open the container to render the inside of the rear container wall 37a easily accessible for packing.

The flexible cover 32a is similar to the flexible cover 32 of FIGS. 1–13, and similarly comprises the flexible top inner closure flap 50a secured to the upper edge of the front container wall 33a, the flexible top outer closure flap 60a with attached protective flaps 90a and 91a for the locking plate (not shown) secured to the upper edge of the rear container wall 37a, and the side flaps 70a with clip rings 71a secured to the upper edges of the flanges 180 of the rear container wall 37a. Elastic tension straps 66a and 78a acting on the flaps 60a and 70a serve to draw back these flaps quickly into opening position when the lock plate is depinned by the rip cord device.

The tray 110a is exactly the same as the tray 110 in the construction of FIGS. 1–13, except that it is connected to the inside of the rear container wall 37a by connections 149a which are shown in the form of bolts passing through cleats, but which, if desired, may be of a more permanent nature. The tray 110a, as in the construction of FIGS. 1–13, is U-shaped, may be rigidized by a stiffener and has two legs 111a and a connecting arched cross-piece 112a. Each leg 111a is made of two parts 113a and 114a, the latter part 114a forming a lower foldable flap extension for the upper leg part 113a and being foldable about a fold line 115a over said upper leg part to permit said lower foldable leg part to be extended outwardly for convenience in packing and to be folded over said upper leg part when the tray 110a has been packed and the two container walls 33a and 37a are to be connected together. Extending along each side of the tray 110a are the fabric loops 135a, 136a and 137a serving to retain the bundles of shroud lines in serpentined order on the tray and connected to the lower end of each upper leg part 113a of the tray is the foldable flap 140a which is adapted to be folded with the corresponding lower leg part 114a about the fold line 115a either in outwardly extended position for packing or in folded position over the upper leg part and which carries snap fastener elements 141a for releasable snap attachment to snap fastener elements 142 on the riser webbings of the harness assembly 81 as described in connection with FIGS. 1–13. Near the inner end of the flap 140a close to the fold line 115a and on the inner face of said flap is a loop (not shown) to permit corded attachment thereto of the connector links 139 of the riser-harness assembly as described also in connection with FIGS. 1–13. Also, a flap 144a is hinged to the inner edge of each lower leg part 114a to separate the risers from the shroud lines between said leg part and the flap 140a, and a flap 146a is hinged to the outer edge of each lower leg part 114a to separate the coils of the shroud lines 44 between the leg parts 113a and 114a.

In the construction of FIGS. 14, 15 and 16, when it is desired to pack the shroud lines 44 for the main parachute 45 onto the tray 110a, the container 31a is opened through the operation of the slide 184. The slide fastener elements 183 may extend along the entire outer peripheries of the container walls 33a and 37a, in which case, the walls may be entirely disconnected as shown in FIG. 14, or the two walls may have slide fastener elements along the entire outer peripheries except along one outer side where the two walls may be connected by a flexible tape to permit the two container walls to be hinged about said tapes while retaining the container walls connected at said outer side. Since the slide fastener elements are usually connected to flexible tapes, these elements may extend around the entire periphery of the container 31a, but in the operation of opening the container, the slide 184 may be stopped short of the last outer side of the container and the flexible fastener tapes on the latter side may be made to serve as hinges allowing the container to be opened about the latter side.

When packing of the case 30a is required, the container 31a is opened in the manner shown in FIG. 14, or to a more limited manner described, to expose the tray 110a. With the lower leg parts 114a of the tray 110a outwardly extended, the shroud lines 44 of the main parachute 45 are stowed in the loops 135a, 136a and 137a. The lower leg parts 114a of the tray 110a are then folded along the fold lines 115a over the upper tray section 116a and the two container walls 33a and 37a are assembled and fastened together by means of the slide fasteners 183. With the container 31a so assembled, the main parachute canopy 47 and the pilot chute 48 are placed in the container 31a and the cover 32a with its elastic straps 66a and 78a and the rip cord device are set up in the manner described in connection with the construction of FIGS. 1–13.

FIGS. 17 and 18 show a modified construction similar to that of FIGS. 14, 15 and 16. In the drawings of FIGS. 17 and 18, except as otherwise noted, parts similar to parts shown in FIGS. 1–13, and FIGS. 14–16, bear the same number but with subscript letter b.

In the specific form shown in FIGS. 17 and 18, the walls 33b and 37b of the container 31b with peripheral flanges 180b and 181b, instead of being entirely separable as in the construction of FIGS. 14, 15 and 16, are permanently hinged together at their lower ends by means of flexible pieces 190, made, as for example of fabric. The peripheral flanges 180b and 181b have a series of holes 191 permitting the container walls 33b and 37b to be laced together with lacing 192.

The tray 110b is similar to that of FIGS. 14, 15 and 16, with the upper main section 116b secured to the rear container wall 37b by means of fasteners 149b. The lower tray leg parts 114b are hinged to the upper tray section 116b by means of the hinge pieces 190 and carried by said lower leg parts and said upper tray section 116b are loops 135b, 136b and 137b for the stowing of the shroud lines 44 of the main parachute 45. Associated with the lower tray leg parts 114b are also flaps (not shown) corresponding to the flaps 140 and 144 of FIGS. 1–13 and flaps 146b corresponding to the flaps 146 of FIGS. 1–13, all of these flaps serving the same purpose as they do in the construction of FIGS. 1–13. Also, the flap elements 50b, 60b and 70b of the flexible cover 32b are provided as in the construction of FIGS. 1–13, and are similarly associated with the container walls 33b and 37b.

The construction of FIGS. 17 and 18 in all other respects is similar to those of FIGS. 1–16, and is similarly manipulated for packing.

In the constructions of FIGS. 14, 15 and 16 and of FIGS. 17 and 18, the tray 110a or 110b are units separate from the container and secured to the rear wall thereof, removably as shown, or permanently, if desired. However, it must be understood, that certain parts of the tray, as for example, the main upper section 116a or 116b, which is secured to the rear container wall 37a or 37b may be formed as part of said rear container wall by stitching or otherwise securing some of the loops for holding the coils of the shroud lines directly onto said wall. Also, as far as certain aspects of the invention are concerned, the tray may be secured to the front container wall instead of to the rear wall.

While the invention has been described with particular reference to specific embodiments, it is to be understood that it is not to be limited thereto but is to be construed broadly and restricted solely by the scope of the appended claims.

What is claimed is:

1. A case for a parachute pack comprising a container made of durable construction permanent enough to retain its integrity during and after parachute deployment and to permit its repeated use, a cover at the open end of said container secured to said container and operable into container opening and closing positions while secured to said container, a tray having means for stowing the shroud lines of a parachute in orderly position thereon, at least a part of said tray being separable from a part of said container to render said tray easily accessible for the packing of the shroud lines of the parachute thereon, and means for releasably holding the container and the entire packed tray inside said container in assembled relation in the forming of a loaded parachute pack and for retaining said container and said tray in assembled relation during and after parachute deployment.

2. A case for a parachute pack as described in claim 1, wherein said container is of rigid material.

3. A case for a parachute as described in claim 1, wherein said container is U-shaped with legs and the tray is similarly U-shaped to fit substantially conformably in the container in packed condition of the case, each of the legs of said tray carrying means for releasably holding bundles of shroud lines of the parachute in predetermined relation to said legs.

4. A case for a parachute as described in claim 1, said tray being doubly foldable about a fold line intermediate the opposite ends thereof, the two sections of the tray on opposite sides of said fold line carrying means for releasably holding the shroud lines in predetermined order and being extendible about said fold line into open position to facilitate stowing of the shroud lines thereon, said tray being shaped to fit in the container when doubly folded.

5. A case for a parachute pack as described in claim 1, wherein said container is U-shaped and the tray is also U-shaped and has a main section adapted to fit substantially conformably in the container and has outer foldable flap leg parts adapted to be folded against said main section, said main section and said leg parts carrying means for releasably holding the shroud lines in predetermined order thereon.

6. A case for a parachute pack as described in claim 1, wherein said container has opposite front and rear walls, and wherein said holding means connects said tray to one of said walls in face to face relationship.

7. A case for a parachute pack comprising a U-shaped container with a front wall and a rear wall, said container being made of durable construction permanent enough to retain its integrity during and after parachute deployment and to permit its repeated use, a cover at the open end of said container operable into container opening and closing positions while secured to said container, a tray for stowing the shroud lines of a parachute having a main section separable from a part of said container to render said tray easily accessible for shroud line packing, said tray being U-shaped and having said main section and leg parts forming leg extensions of said main section foldable about a fold line against said main section, said main section and said leg parts carrying means for releasably holding the shroud lines in predetermined order thereon and being extendible about said fold line into open position to facilitate stowing of the shroud lines thereon, the separability of said main section from a part of said container permitting said tray to be so extended, said main section conforming substantially in size and shape with one of said container walls, means securing said main section to the latter wall in face to face contact and for retaining said main section to the latter container wall during and after parachute deployment, and means for releasably holding the container and the entire packed tray inside said container in assembled relation in the forming of a loaded parachute pack.

8. A case for a parachute case, as described in claim 1, said container being a unitary structure and said tray being entirely disconnectable from said container but being adapted to be releasably connected to a wall of said container.

9. A case for a parachute case as described in claim 1, said container being in one rigid piece, and said tray being entirely disconnectable from said container and being adapted to be releasably connected to a wall of said container.

10. A case for a parachute case as described in claim 1, said container being a unitary structure and said tray being entirely disconnectable from said container and comprising two sections separated by a fold line about which said sections are foldable into closed face to face confronting relationship for packing or into open extended position to permit convenient stowing of the shroud lines of the parachute thereon, said tray when folded into closed condition fitting into said container, both of said tray sections carrying means for releasably holding the shroud lines in predetermined order for parachute deployment.

11. A case for a parachute pack comprising a U-shaped container made as a rigid unitary structure and having a front wall and a rear wall, said container being made of durable construction permanent enough to retain its integrity during and after parachute deployment and to permit its repeated use, a cover at the open end of said container secured to said container and operable into container opening and closing positions while secured to said container, a tray for packing the shroud lines of a parachute entirely disconnectable from said container, said tray being U-shaped and having a main section and leg parts forming leg extensions of said main section foldable about a fold line against said main section, said main section and said leg parts carrying means for releasably holding the shroud lines in predetermined order thereon and being extendible about said fold line into open position to facilitate stowing of the shroud lines thereon, the separability of said tray from said container permitting said tray to be so extended, said main section conforming substantially in size and shape with one of said container walls, and means for releasably securing said main section to the latter wall in face to face contact and for retaining said main section secured to the latter container wall in said face to face contact during and after parachute deployment.

12. A case for a parachute pack as described in claim 1, said container being split into two parts to render the inside of said container easily accessible for packing, and carrying means for releasably connecting said container parts together into container defining relationship, said tray being connected to one of said container parts.

13. A case for a parachute pack as described in claim 1, said container having opposed front and rear walls separable to render the inside of said container easily accessible for packing, said container walls carrying means for releasably connecting said container walls together into container defining relationship, said tray having a section connected to one of said walls in face to face relationship.

14. A case for a parachute pack as described in claim 1, said container having opposed front and rear walls separable to render the inside of said container easily accessible for packing and carrying means for releasably connecting said walls together in container defining relationship, said tray comprising two sections carrying means for releasably holding the shroud lines in predetermined order thereon, said tray sections being separated by a fold line about which said sections are foldable into closed face to face confronting relationship for packing or into open extended position to permit convenient stowing of the shroud lines of the parachute thereon, said tray having on of said sections connected to one of said container walls in face to face relationship, and being shaped when folded into closed condition to fit into the container.

15. A case for a parachute pack comprising a U-shaped container having a rigid front wall and a rigid rear wall, separable to render the inside of said container easily accessible for packing, said container being of durable construction permanent enough to retain its integrity during and after parachute deployment and to permit its repeated use, means for releasably connecting said walls together in container defining relationship, a cover at the open end of said container secured to said container and operable into container opening and closing positions while secured to said container, a U-shaped tray for packing the shroud lines of a parachute comprising a main section and leg parts forming leg extensions of said main section foldable about a fold line against said main section, said main section and said leg parts carrying means for releasably holding the shroud lines in predetermined order thereon and being extendible about said fold lines into open position to facilitate stowing of the shroud lines thereon, said main section being substantially the size and shape of one of said container walls and means for releasably connecting said main section to the latter wall in face to face relationship and for retaining said main section and said latter wall connected during and after parachute deployment, said tray when folded fitting in the container.

16. A case for a parachute pack as described in claim 1, said container having opposed completely disconnectable front and rear rigid walls with rigid peripheral flanges carrying means for releasably connecting said walls together into container defining relationship, said tray having a section connected to one of said walls in face to face relation.

17. A case for a parachute pack as described in claim 16, said means for releasably connecting said walls together into container defining relationship comprising a slide fastener extending around the edges of said flanges.

18. A case for a parachute pack as described in claim 1, said container having opposed rigid front and rear walls hinged together, and carrying means releasably connecting said walls together into container defining relationship and said tray having a section connected to one of said walls in face to face contact therewith and another foldable section adapted to extend along the other wall in face to face relationship therewith in folded condition when said walls are connected together.

19. A case for a parachute pack as described in claim 18, said means for releasably connecting said walls together into container defining relationship comprising lacing.

20. A tray for releasably holding the shroud lines of a parachute in condition for packing into a container and for parachute deployment, comprising a U-shaped main section and parts forming leg extensions of said main section and foldable about a fold line against said main section, said tray having a series of loops for releasably holding the shroud lines in serpentined form.

21. A tray as described in claim 20, said tray constituting a unit separate from the parachute container and adapted to be releasably secured to a wall of said container.

22. A tray as described in claim 20 including a stiffener for said main section, the leg extension parts being flexible.

23. A tray as described in claim 20, including a flap on each leg extension foldable therewith and having means for detachably securing thereto a riser of a riser-harness assembly.

24. In combination, an aircraft seat ejection system, and a personnel pack adapted to be supported on the seat, said pack including a container defining a compartment for a parachute made of durable construction permanent enough to withstand high speed ejection and to retain its integrity during and after parachute deployment while the pack is moving at high speed and to permit its repeated use, a tray having means for stowing the shroud lines of the parachute in orderly position thereon, at least a part of said tray being separable from a part of said container to render said tray easily accessible for the packing of the shroud lines of the parachute thereon, and means for releasably holding the container and the entire packed tray inside said container in assembled relation in the forming of the loaded parachute pack and for retaining said tray inside said container during and after parachute deployment.

References Cited in the file of this patent

UNITED STATES PATENTS

| | | |
|---|---|---|
| 2,389,578 | Quilter | Nov. 20, 1945 |
| 2,687,263 | Frieder et al. | Aug. 24, 1954 |
| 2,760,741 | Tauty | Aug. 28, 1956 |
| 2,922,604 | Hatfield | Jan. 26, 1960 |
| 2,940,702 | Martin | June 14, 1960 |
| 2,973,173 | Zelinskas | Feb. 28, 1961 |

FOREIGN PATENTS

| | | |
|---|---|---|
| 1,123,418 | France | June 11, 1956 |